United States Patent

Alinari

[15] 3,677,087
[45] July 18, 1972

[54] DEPTH GAUGES

[72] Inventor: Carlo Alinari, Corso Vittorio Emanuele 200, Turin, Italy

[22] Filed: Dec. 31, 1970

[21] Appl. No.: 103,095

[30] Foreign Application Priority Data

Jan. 2, 1970 Italy..................................67003 A/70

[52] U.S. Cl.................................73/300, 73/431
[51] Int. Cl.........................................G01f 23/14
[58] Field of Search..................73/300, 431, 374, 376, 377, 73/388, 401

[56] References Cited

UNITED STATES PATENTS 3,188,864  6/1965  Dean .......................................73/300
3,528,290  9/1970  Lecocq....................................73/300

FOREIGN PATENTS OR APPLICATIONS 1,011,265  6/1952  France....................................73/300

Primary Examiner—Louis R. Prince
Assistant Examiner—Denis E. Corr
Attorney—Sughrue, Rothwell, Mion, Zinn & Macpeak

[57] ABSTRACT

A depth gauge comprises a support of elastomeric material formed with an annular groove in which a thick-walled transparent gauge tube sealed at one end and open at its other end for access of water is snap mounted. Visual contrast between the water and air columns in the gauge tube is improved by the provision of a light-reflecting coating on an inclined portion of the support adjacent the groove receiving the gauge tube.

4 Claims, 5 Drawing Figures

PATENTED JUL 18 1972 3,677,087
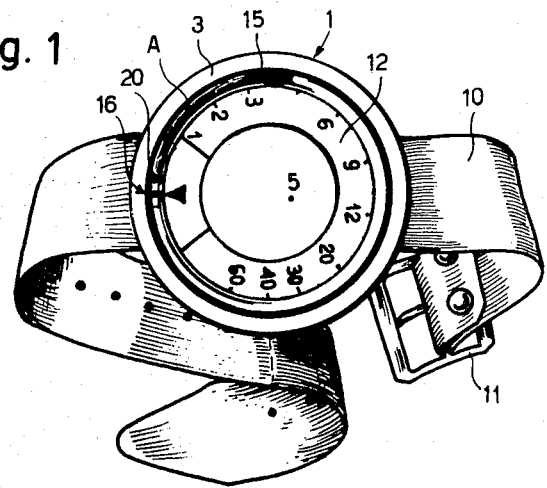
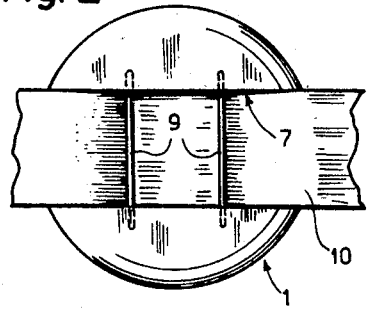
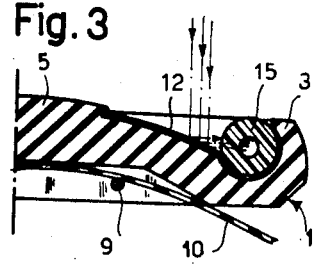
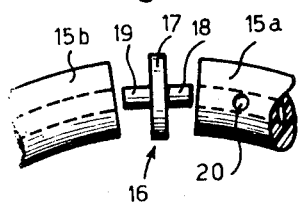
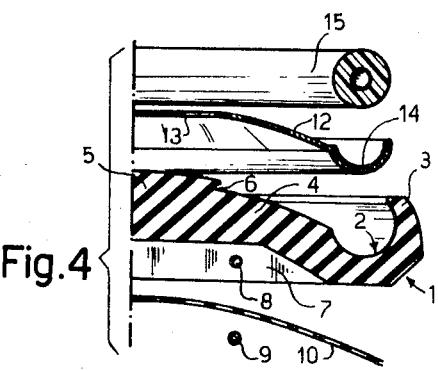
INVENTOR
CARLO ALINARI
BY Sughrue, Rothwell, Mion, Zinn & Macpeak
ATTORNEYS

DEPTH GAUGES

The invention relates to depth gauges of the type comprising a pressure gauge tube of transparent material sealed at one end and open at its other end for access of water which compresses the air within the tube and reaches into the tube by an extent increasing with the plunging depth, thereby indicating by its meniscus the plunging depth reached on a graduated scale associated with the tube.

In depth gauges of the abovementioned type, the primary problem is the visibility of the submerged instrument in a scarcely lighted medium.

Attempts have therefore been made at improving perception by the eye of the water-filled tube portion for the purpose of contrast with its air filled portion, since the meniscus at the boundary between the two portions is equivalent to an indicator for the depth reached.

The achievements in this field have not been very bright notwithstanding the considerable efforts made by the designers.

The invention obviates the above drawbacks by providing in depth gauges of the above mentioned type an improved visibility of the meniscus at the boundary between the water-filled and air-filled tube portions, thereby to facilitate reading of the indicated depth.

A further object of the invention is to provide a depth gauge of the above mentioned type which is highly effective, and easily read even in a scarcely lighted medium.

A further object of the invention is to provide a depth gauge of the above mentioned type which is simple and sturdy in construction and easily disassemblable.

The primary feature of the depth gauge according to the invention resides in the fact that the depth gauge comprises a resiliently deformable support having attached thereto a strap and formed at the top with an annular groove of channel-shaped section, semicircular in cross section of a width somewhat larger than 180°, a metal panel adapted to interfit with the middle top portion of the support and having a dial provided with a graduated scale encircled by an annular channel provided with a blackened bottom adapted to be engaged by the groove in the support and a transparent tube adapted to be engaged by the groove in the support and amounting in thickness to about ⅓ its outer diameter.

Further characteristic features and advantages of the invention will appear from the appended description referring to the accompanying drawings showing an embodiment by way of example.

FIG. 1 is a top view of a depth gauge according to the invention,

FIG. 2 is a bottom view thereof,

FIG. 3 is an axial sectional view on an enlarged scale,

FIG. 4 is an exploded axial sectional view and

FIG. 5 is a plan view on an enlarged scale of a detail of FIG. 1.

The depth gauge according to the invention comprises a support 1 of an elastomeric material such as synthetic or natural rubber, formed at its top with an annular groove 2 of channel-shaped section. The groove 2 is of semicircular cross section, its width being 180°. The groove is confined to the outside by a resilient lip 3. The support 1 has a convex top and a middle portion 5 separated by an undercut annular groove 6 from an intermediate annular region 4.

The support 1 is formed at its bottom with a recess 7, confined by two opposite walls formed with seatings 8 for two parallel pins 9 retaining a resilient strap 10 provided with a buckle 11 for attaching the depth gauge to the users' wrist.

The annular top portion 4 of the support 1 is fitted with a metal panel 12, accurately matching and coupled with the intermediate support portion, formed with a central bore 13 for snap engagement into the groove 6 in the support. The panel 12 is formed with a circumferential groove 14 with a blackened bottom adapted to fit into the groove 2 in the support.

The middle portion of the panel 12 is silver plated and carries a graduated scale. The groove 14 in the metal panel accommodates a flexible transparent tube 15 of ring shape, which is snap retained on the apparatus by means of the resilient lip 3.

The tube 15 is of considerable thickness. As distinct from tubes employed in conventional depth gauges, having a wall thickness of about ⅛ their outer diameter, in the depth gauge according to the invention the thickness of the tube is about ⅓ its outer diameter. As a result of the considerable thickness of the tube 10 the refraction index of the material is utilized for improving visibility of the water column in the tube to thereby effect an indication of the depth reached by contrast with the air-filled portion. The presence of water within the tube results in variation of the total refraction index, whereby the user perceives at the water-filled tube portion a wide dark strip, the end meniscus of which is the reference pointer indicating the depth on the graduated scale on the metal panel 12.

The silver-plated panel 12 assists in reflecting towards the transparent tube 15 the light rays incident on the panel (FIG. 3), whereby the user will perceive a wide silver strip at the air-filled portion of the tube.

The two opposed ends of the tube 15a, 15b are connected with a plug 16 which, as shown in FIG. 5, is formed by an intermediate flange 17 and two opposed pins 18,19 adapted to be forced into each tube end, respectively. The tube end 15a is formed with a radial bore 20 through which water enters during operation.

The above described depth gauge is easily disassemblable for cleaning the tube 15 which is held on the instrument by the resiliency of the outer lip 3.

The considerable thickness of the tube 15 makes its air-filled portion perceivable by the user in the form of a silver strip, similarly as with a mercury-filled tube.

Moreover, the depth gauge described above is extremely simple, tough and cheap in construction and safe and reliable in operation.

It will be understood that within the principle of the invention constructional details and embodiments may be widely varied with respect to the example described and shown without departing from the scope of the invention.

What we claim is:

1. Depth gauge of the type comprising a pressure gauge tube of transparent material sealed at one end and open at its other end for access of water which compresses the air within the tube and reaches into the tube by an extent increasing with the plunging depth, thereby indicating by its meniscus the plunging depth reached on a graduated scale associated with the tube, characterized by comprising a resiliently deformable support (1) having attached thereto a strap (10) and formed at the top with an annular groove (2) substantially semicircular in cross-section embracing somewhat more than 180° in said cross-section, a metal panel (12) adapted to interfit with the middle top portion (4,5) of the support and having a dial provided with a graduate scale encircled by an annular channel (14) provided with a blackened bottom adapted to be engaged by the groove (2) in the support (1) and a transparent tube (15) adapted to be engaged by the groove (2) in the support and amounting in thickness to about ⅓ its outer diameter.

2. Depth gauge as claimed in claim 1, characterized by the fact that the metal panel (12) is engaged by snap action on a projecting middle portion (5) of the support (1) and is formed with a convex, silver-plated top for reflecting light rays towards the transparent tube (15).

3. Depth gauge as claimed in claim 1, characterized by the provision at opposed ends of the tube (15a,15b) of a plug having an intermediate flange (17) and two opposite pins (18,19) adapted to be forced into the tube portions, respectively, one tube end being provided with a radial bore (20) for establishing communication with the outside.

4. Depth gauge as claimed in claim 1, characterized by the fact that the support (1) is formed with a rear recess (7) accommodating a strap (10) retained by two pins (9) spanning the two opposite walls of said recess.

* * * * *